Fig. 1

INVENTORS
ARNOLD R. BUCHHOLZ
GEORGE V. JOHNSON
ARNOLD J. KRAUSE

BY Thomas W. Ehrmann

ATTORNEY

INVENTORS
ARNOLD R. BUCHHOLZ
GEORGE V. JOHNSON
ARNOLD J. KRAUSE
BY
Thomas W. Ehrmann
ATTORNEY July 7, 1970  A. R. BUCHHOLZ ET AL  3,518,923
PRE-CRIMPED COIN WRAPPER FORMING APPARATUS
Filed Aug. 11, 1967  8 Sheets-Sheet 4

INVENTORS
ARNOLD R. BUCHHOLZ
GEORGE V. JOHNSON
ARNOLD J. KRAUSE
BY

ATTORNEY

INVENTORS
ARNOLD R. BUCHHOLZ
GEORGE V. JOHNSON
ARNOLD J. KRAUSE

July 7, 1970   A. R. BUCHHOLZ ET AL   3,518,923
PRE-CRIMPED COIN WRAPPER FORMING APPARATUS
Filed Aug. 11, 1967   8 Sheets-Sheet 7

INVENTORS
ARNOLD R. BUCHHOLZ
GEORGE V. JOHNSON
ARNOLD J. KRAUSE

BY Thomas W. Ehrmann
ATTORNEY

United States Patent Office 3,518,923
Patented July 7, 1970

3,518,923
PRE-CRIMPED COIN WRAPPER FORMING APPARATUS
Arnold R. Buchholz and Arnold J. Krause, Watertown, and George V. Johnson, Oconomowoc, Wis., assignors to Brandt Automatic Cashier Co., Watertown, Wis., a corporation of Wisconsin
Filed Aug. 11, 1967, Ser. No. 659,935
Int. Cl. B31c *13/00*
U.S. Cl. 93—77                                                4 Claims

ABSTRACT OF THE DISCLOSURE

A web of wrapper stock is continuously withdrawn from a roll by mating driven and idler rollers and moved along a track. A knife blade and cutting die are disposed intermediate of the track and cooperate, when actuated, to sever the web to form wrapper blanks. The leading edge of a wrapper blank is introduced through a tangential opening in a hollow forming cylinder at the end of the track as the web is severed. The blank is formed into a tube about a mandrel disposed in the cylinder and continuously rotated by an electric motor which also drives the driven roller. A spindle is slidably received in the mandrel and includes a spindle head which normally forms an extension of the mandrel. A crimping blade is movable from an idle position to a working position to cooperate with the spindle head to crimp one end of the formed tube. The spindle is extended to extract the formed and pre-crimped wrapper from the mandrel and actuate a removal mechanism which grips the wrapper so that the spindle can retract. The next actuation of the knife blade deactuates the removal mechanism and the wrapper drops from the apparatus.

A cam shaft, also driven by the motor, controls the cycle of operation of the knife blade, the movement of the crimping blade, and the extension and retraction of the spindle. Switches connected in the circuit for energizing the motor will cause the motor to stop if the web material on the roll is nearly exhausted, if the web jams in the knife blade and cutting die, or if the spindle is attempted to be extended when the crimping blade is in its path of travel. An ink roller is also shown associated with the driven or idler rollers to print an appropriate legend on the wrapper stock as it passes through the apparatus.

BACKGROUND OF THE INVENTION

This invention relates to a coin wrapper forming apparatus, and particularly to an apparatus which will operate upon a roll of wrapper stock and will continuously cut the wrapper stock into wrapper blanks, form the blanks into tubes, crimp one end of the formed tube, and eject the pre-crimped coin wrapper from the apparatus.

Coin wrappers are used by the thousands by certain consumers such as banks and vending machine companies, to package the coins which they handle. Coin wrappers are available in two general forms: either as a flattened tube which must be closed at both ends after the coins are inserted, or as a tube which is crimped at one end with the crimp maintaining the cylindrical shape of the tube. The pre-crimped form is employed by large users because commercially available coin counting and packaging machines will dispense the coins directly into the open end of the pre-crimped wrapper. Then, by crimping the open end on motor driven crimping equipment, the packaging of the coins is accomplished expeditiously.

Storage and shipment of quantities of the pre-crimped coin wrappers present problems. If the users are required to obtain their supplies of pre-crimped wrappers from manufacturers of the same, large areas must be set aside for storage on the user's premises and shipping charges are disproportionally high for the weight involved because of the large volume which the empty pre-crimped wrappers occupy. Thus, a need exists for a machine which can be installed on the end user's premises to manufacture the pre-crimped wrappers as they are needed. The apparatus of this invention is such a machine.

The apparatus of this invention can accept wrapper stock material in roll form and continuously manufacture, at high rates of production, fully formed pre-crimped coin wrappers. As many precrimped wrappers can be manufactured as desired and it is not necessary to maintain supplies of the formed wrappers. The only supplies needed to be stored are the rolls of wrapper stock. The apparatus also lends itself to the printing of appropriate legends on the coin wrappers as the stock passes through the apparatus so that plain stock material may be used.

SUMMARY OF THE INVENTION

An apparatus in accordance with the invention comprises a base, means mounted on the base to receive a roll of wrapper stock, a web track on the base, means for withdrawing the web of wrapper stock from the roll and moving it along the track, means disposed intermediate of the track for severing the web into wrapper blanks, tube forming means to form the blank into a tube, and crimping means to crimp one end of the formed tube. The invention further resides in means for positively extracting the pre-crimped wrapper from the tube forming means and ejecting the formed wrapper from the apparatus. The apparatus can function to continuously manufacture pre-crimped wrappers from the wrapper stock, with provision for introducing the leading edge of the web into the tube forming means, from which a previously formed wrapper has been extracted, at the same time that the knife means is actuated to sever the web into a blank.

The invention also includes: the provision of control means to coordinate the cycle of operation of the knife means, the crimping means, and the means for extracting the wrapper from the tube forming means; the provision of means for printing an appropriate legend on the web as it passes through the apparatus; and safety controls to halt the operation of the apparatus if the roll of wrapper stock is nearly exhausted, if the web jams in said knife means, or if the formed wrapper is attempted to be extracted from said tube forming means when said crimping means is not clear of the tube forming means.

In the specification and accompanying drawings, a preferred embodiment of the present invention is disclosed and described in such full, clear, concise and exact terms as to enable any person skilled in the art to make and use it. However, the embodiment thus disclosed merely represents the best mode presently contemplated for carrying out this invention, and the invention is not limited to the specific embodiment.

DESCRIPTION OF THE PREFERRED EMBODIMENT

Referring specifically to the drawings, the components of the machine are mounted on a suitable base 20 including a top plate 21. A pair of spaced, upright stanchions 22 rise from the top plate 21 and are formed at their upper extremities with an inclined slot 23 that receives and supports a shaft 24 which mounts the core of a roll 25 of coin wrapper stock material. The roll 25 and shaft 24 are freely rotatable on the stanchions 22 to permit the web 26 of coin wrapper stock to be withdrawn from the roll. However, because the rolls of material may vary somewhat in width a spring plate 27 is attached to the right stanchion 22 to urge the roll 25 against the left stanchion 22 and thereby establish the left edge of the web as a control edge. An idler roller 28 is mounted on an idler shaft 29 journaled at its ends in bearings mounted in the stanchions 22. Disposed directly below the idler shaft 29 and parallel thereto is a driven shaft 30 that mounts a pair of spaced feed rollers 31 having a peripheral surface of high friction material, such as rubber, polypropylene or polyurethane. An arcuate guide 32, supported on an end plate 33 connected across the rear ends of the stanchions 22, extends between the feed rollers 31 to a point below the idler roller 28. The web 26 is threaded between the idler roller 28 and the feed rollers 31 and above the guide 32. The web 26 is drawn from the roll 25 by the cooperating feed rollers 31 and idler roller 28.

Figure 6:
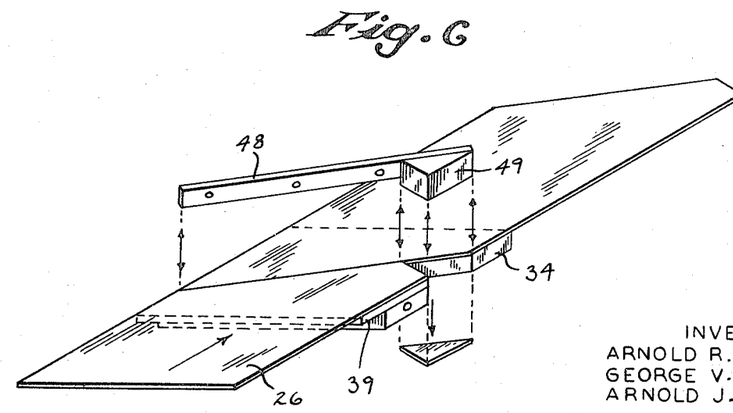
FIG. 6 is a view in perspective illustrating a cutting die and blade and the paper web upon which the cutting die operates.

The cooperating feed rollers 31 and idler roller 28 also push the web 26 through a cutting stage that includes an anvil 34 disposed between the stanchions 22 and which defines the start of a runway. The runway is further defined by a plate 35 held at its sides in formed channel members 36 and 37 secured to the stanchions 22 and having flange portions that extend over and are spaced above the upper surface of the plate 35 to receive the edges of the web 26. The anvil 34 is provided at one edge with a triangular notch 38, as illustrated in FIG. 6. A cutting die 39 is mounted on a portion of the upper surface of the anvil 34 and is provided with an angular leading edge, one portion of which coincides with one side of the triangular notch 38 and the other side of which is defined by a straight line extension of the other side of the triangular notch 38 and consequently is askew of the web runway.

A thin resilient stripper plate 40 is secured to the left stanchion 22 and overlies the lower die 39. The right side of the stripper plate 40 engages a button actuator of a stripper plate switch 41 and normally holds the same depressed. The stripper plate 40 includes a portion that extends between the idler roller 28 and feed rollers 31.

The web 26 is threaded between the upper stripper plate 40 and the anvil 34 and affixed cutting die 39 to have a cutting mechanism, to be described, operate upon the web to cut it into segments having the shape illustrated in FIG. 6. That is, the leading edge of each cut segment corresponds in configuration to the leading edge of the cutting die 39 and the trailing edge of the segment is defined by a straight line parallel to the longest front edge.

Referring to FIGS. 1, 3, 4 and 5, the cutting mechanism includes a support bar 42, the ends of which project outwardly through openings in the stanchions 22 and are supported thereon. The support bar 42 mounts the anvil 34 and has enlarged ends provided with through bores that receive and hold vertical guide rods 43. A blade holder 44 is disposed above and about the ends of the support bar 42. The blade holder 44 includes a cross bar portion 45 that spans the stanchions 22 and a pair of yoke portions 46 that extend outwardly of the stanchions 22 and receive the projecting ends of the support bar 42. The yoke portions 46 are provided with bores and are slidably received on the upper and lower ends of the guide rods 43. A compression spring 47 is biased between the upper surface of the support bar 42 and each yoke portion 46 to urge the blade holder 44 upwardly with respect to the anvil 34.

A blade 48 is secured to one side of the cross bar portion 45 of the blade holder 44 and the blade 48 has a cutting edge which extends below the bottom of such cross bar portion 45. A triangular-shaped punch 49, which mates with the notch 38 of the anvil 34, is secured to the blade 48 and projects below the cutting edge thereof. Depression of the blade holder 44 against the force of the compression springs 47 will cause the blade 48 and punch 49 to cooperate with the anvil 34 and cutting die 39 to sever the web 26 in a manner which yields the desired shape of a blank segment. The removed triangular scraps of the web can then fall through the notch 38. However, to prevent the triangle scrap from sticking to the punch 49, a nub 50 projects from the underside of the punch 49 and tends to bow the triangle scrap and have it catch in a resilient insert 51 of polyurethane or the like that projects from a side of the notch 38 in the anvil 34 (see FIG. 5). After triangle scraps are built-up in the insert 51 they are forced out of the notch by the punch 49.

Controlled depression of the blade holder 44 is accomplished by a lever 52 pivoted intermediate its ends on a standard 53. The lever 52 mounts a spherically headed set screw 54 at one end that engages the top of the cross bar portion 45. The lever 52 is pivoted intermediate its ends on a standard 54. The other end of the lever 52 mounts a roller 55 which engages a cutter cam 56 having a single riser 57 that will pivot the lever 52 and thereby depress the blade holder 44 to cut the web 26 once for each revolution of the cutter cam 56.

The power for driving the feed rollers 31 and for rotating the cutter cam 56, is obtained from an electric motor 58. The motor shaft mounts a pulley 59 which drives a belt 60 connected about a pulley 61 secured to a through shaft 62 of a right angle transmission 63. The through shaft 62 includes a worm gear section 64 that meshes with a gear 65 secured to a cam shaft 66. The cam shaft 66 is journaled in bearings provided in the gear box and in a bearing 67 mounted on the top plate 21. Meshing bevel gears 68 and 69 are keyed to an end of the cam shaft 66 that projects through the bearing 67 and the driven shaft 30, respectively. The right angle transmission 63 performs a speed reduction in transmitting power from the through shaft 62 to the cam shaft 66 and consequently the driven shaft 30 is caused to rotate at a speed less than that at which the motor 58 drives the through shaft 62. The cam shaft 66 mounts the cutter cam 56 which actuates the cutting mechanism.

After leaving the cutting stage, the blank travels over the plate 35 with its edges guided between the plate 35 and the flanges of the channel members 36 and 37. The leading edge of the blank is introduced into a forming cylinder 70 through a bottom tangential opening 71 therein. The cylinder 70 is secured to the plate 35 by a plate 72 that guides the web through the opening 71 into the interior of the cylinder 70. The spacing between the cylinder 70 and the cutting mechanism is such that the leading edge of the web is introduced into the cylinder before the web is severed to form the blank.

Figure 4:
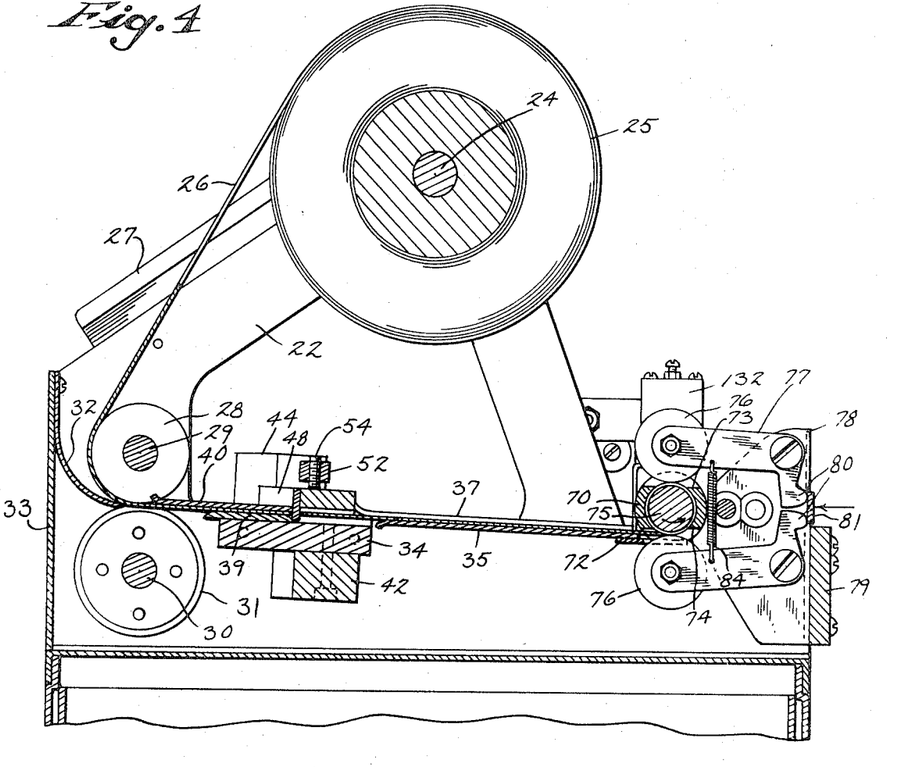
FIG. 4 is a view in vertical section taken in the plane of the line 4—4 of FIG. 1.
Figure 5:
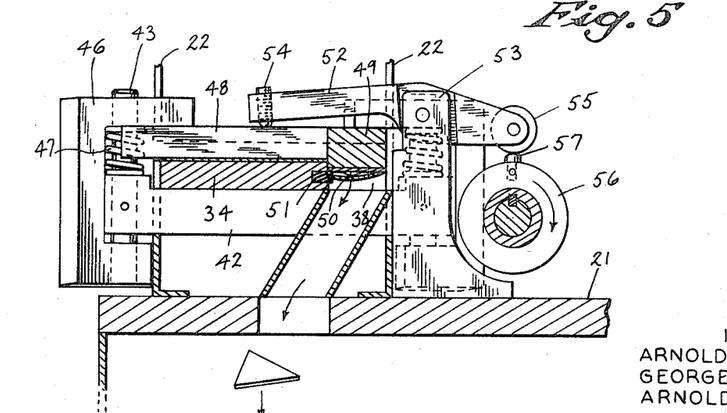
FIG. 5 is a view in vertical section taken in the plane of the line 5—5 of FIG. 1.

As seen in FIG. 4, a slot 73 extends to the interior of the cylinder 70 through the top thereof and a similar slot 74 is provided at the bottom through the cylinder 70 and the plate 72. A mandrel 75, formed as an extension of the through shaft 62, projects through the cylinder 70 and is concentric therewith. The mandrel 75 has a diameter less than the inner diameter of the cylinder 70 to accommodate several thicknesses of the blank. The mandrel 75 will rotate with the through shaft 62 to wind the blank in to tube about the mandrel 75. Upper and lower gripping rollers 76 project through the slots 73 and 74 and are adopted to hold the blank to the periphery of the mandrel 75, and the mandrel is knurled in the area of the rollers 76 to assist in achieving this result.

Referring to FIG. 4, the gripping rollers 76 are each mounted for free rotation on one arm of a bell crank lever 77 pivotally mounted on one leg of a U-shaped standard 78 secured to a front plate 79 that spans the stanchions 22. The other arms of the bell crank levers 77 include projecting fingers 80 which are engageable by an upset flat portion 81 of a lever 82. The lever 82 is pivotally supported between its ends with the upset flat portion 81 forming one end of the lever 82 and with a cam roller 83 mounted on the other end. The gripping rollers 76 are spring biased towards engagement with the mandrel 75 by a tension spring 84 connecting the two bell crank levers 77. The gripping rollers 76 are shifted away from engagement with the mandrel 75 by pivoting the lever 82 towards the fingers 80 which causes the roller supporting arms of the bell crank levers 77 to be rotated away from each other. Such pivoting of the lever 82 is accomplished by a cam 85 mounted on the projecting end of the cam shaft 66 and having a lateral cam surface 86 engaged by the roller 83.

Figure 10:
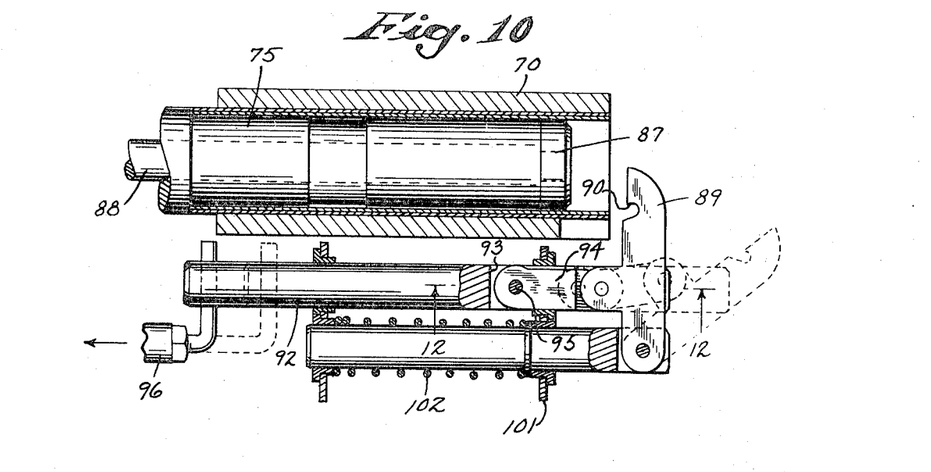
FIGS. 10 and 11 are top plan views, and partly in horizontal section, of the crimping mechanism of the machine showing such mechanism in two operating positions.
Figure 11:
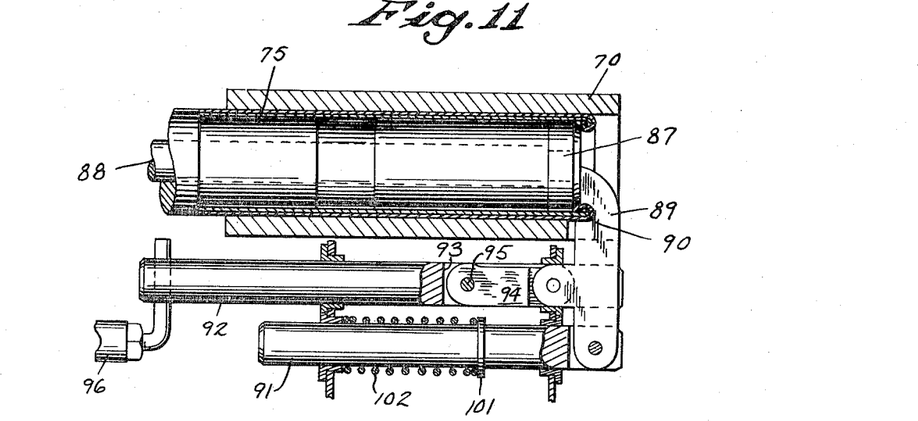

As can be seen in FIGS. 10 and 11, the mandrel 75 does not extend for the full length of the cylinder 70 and does not occupy the entire length of the tube of web material formed in the cylinder 70. A separate spindle head 87 is mounted on the end of a spindle 88 that is slidably received in a bore extending through the mandrel 75 and the through shaft 62. The normal retracted position of the spindle 88 places the spindle head 87 adjacent the end of the mandrel 75 and in this position there is an overlap of blank material within the cylinder 70. This overlap is employed to form a crimped end of the wrapper.

Figure 12:
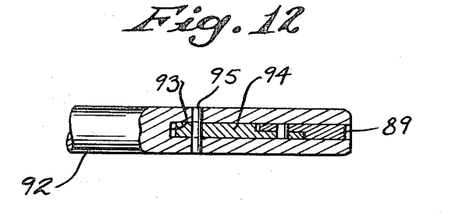
FIG. 12 is a view in vertical section taken in the plane of the line 12—12 of FIG. 10.
Figure 13:
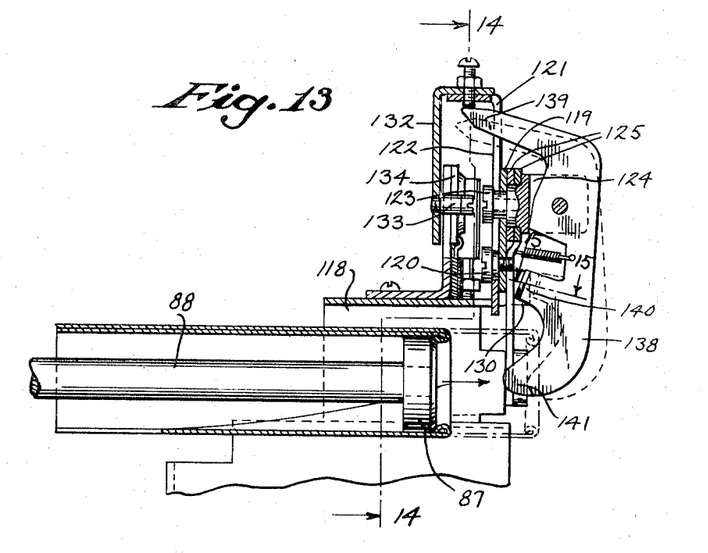
FIG. 13 is a view in vertical section through the coin wrapper gripper section of the machine.

Crimping is accomplished by a crimper blade 89 having a suitable notch 90 in one edge thereof, which notch is provided with a generally circular profile. The crimper blade 89 is pivotally connected at an end remote from the notch 90 on a rod 91 that is journaled for sliding movement in bearings in aligned bores in two arms of the U-shaped standard 78. A second rod 92 is similarly journaled for sliding movement in sleeve bearings mounted in the standard 78 and is parallel to the rod 91. The rod 92, as seen in FIG. 12, is provided with a central slot 93 adjacent one end and a link 94 is pivotally mounted in the slot 93 on a pin 95. The opposite end of the link 94 is pinned to a projecting arm of the crimper blade 89.

The free end of the rod 92 is connected to a yoke 96 pivotally attached to one end of a lever 97. The lever 97 is pivotally mounted intermediate its ends. The opposite end of the lever 97 mounts a cam roller 98 which is urged by a spring 99 to ride upon the periphery of a cam 100 keyed to the cam shaft 66. A retaining ring 101 is placed in a groove in the rod 91 and a compression spring 102 is biased between the retaining ring 101 and the left arm of the standard 78. When the cam roller 98 is disposed on a low point of the cam 100, the lever 97 will force the rod 92 outwardly. Since the retaining ring 101 will prevent movement of the rod 91 beyond a certain point, the crimper blade 89 will be pivoted outwardly away from the cylinder 70. Such a position of the crimper blade 89 is shown in dotted lines in FIG. 10.

Figure 1:
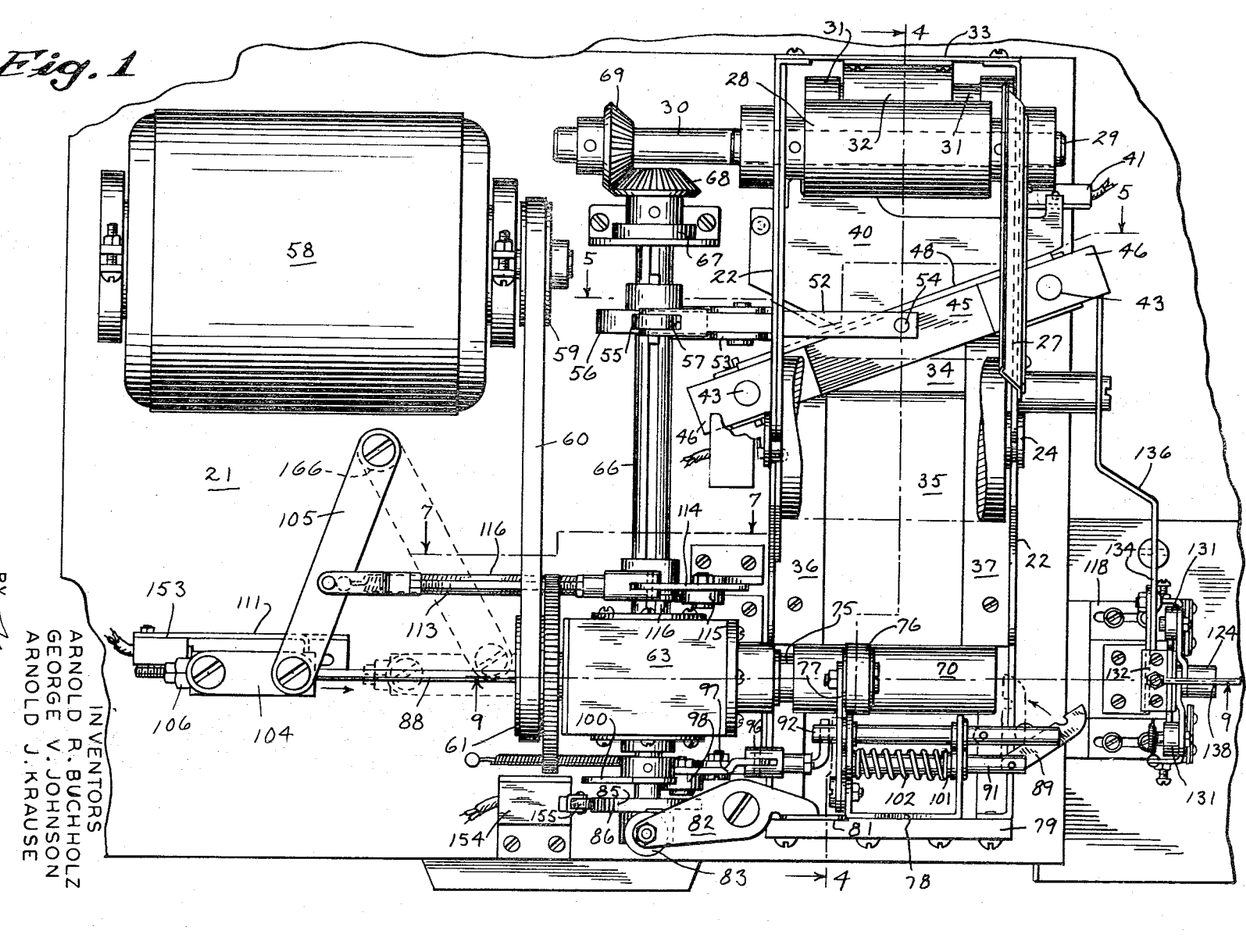
FIG. 1 is a top plan view of a coin wrapper forming machine in accordance with the invention, with the cover removed.
Figure 2:
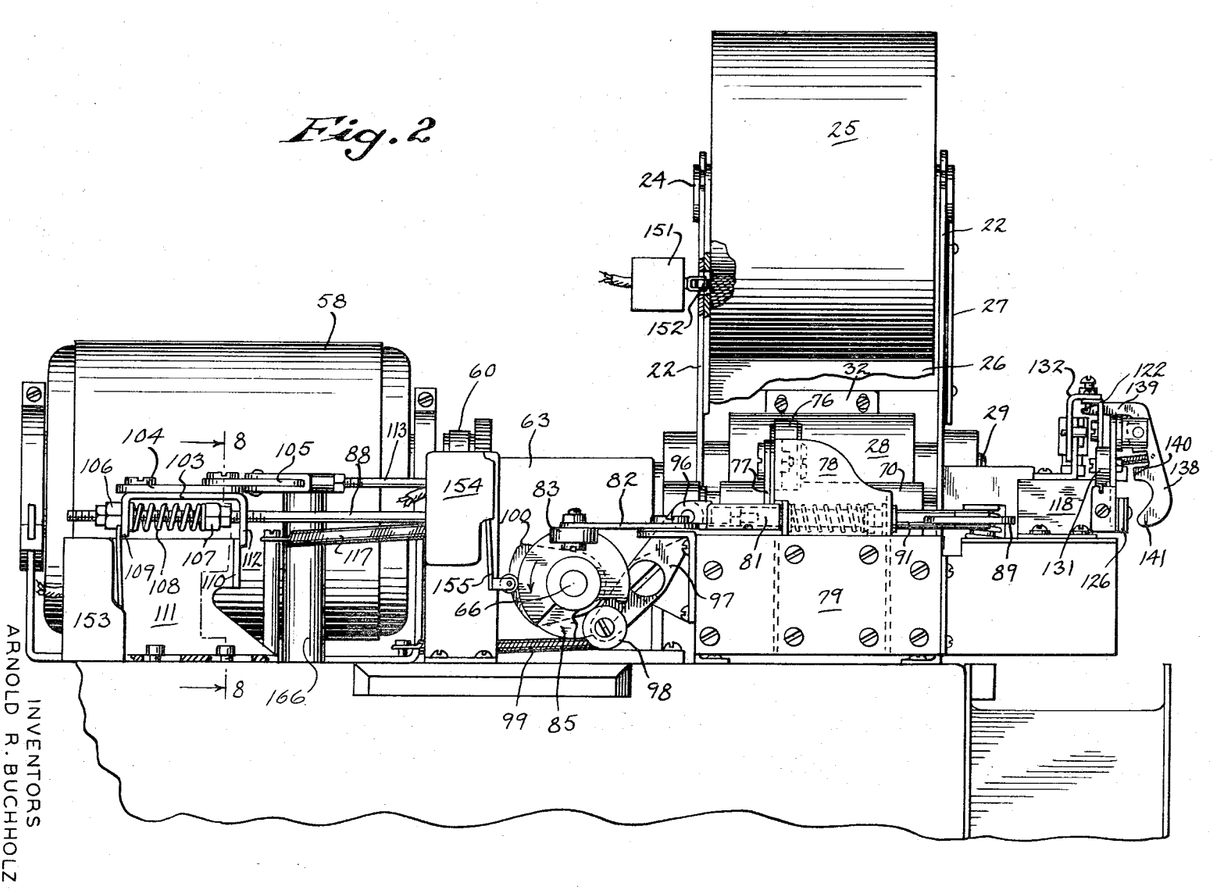
FIG. 2 is a front view in elevation of the machine of FIG. 1.
Figure 3:
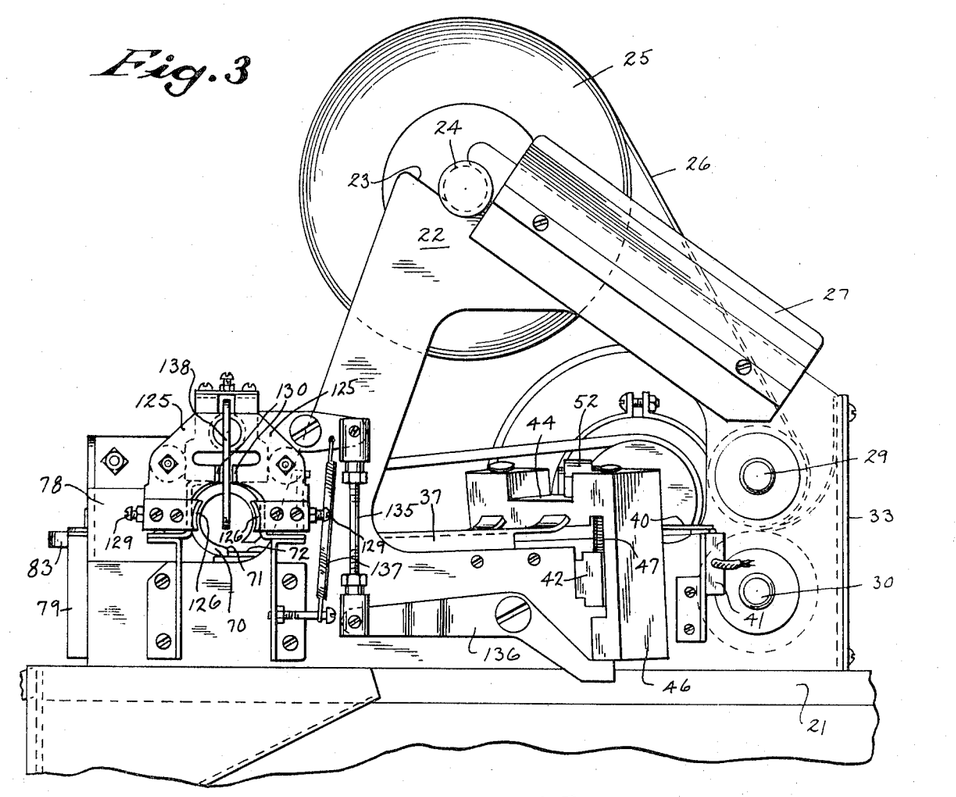
FIG. 3 is a side view in elevation looking toward the right side of the machine of FIG. 1.

As the cam shaft 66 is rotated in a counterclockwise direction as viewed in FIG. 2, the cam 100 displaces the roller end of the lever 97 and pivots the lever 97 to pull the rod 92 inwardly. As the rod 92 is retracted, the crimper blade 89 pivots about its attachment to the rod 91 which is initially held stationary by the compression spring 102. However, as soon as the crimper blade assumes the perpendicular position shown in full lines in FIG. 10, further retraction of the rod 92 by the cam 100 operates through the crimper blade 89 to also retract the rod 91 against the force of its compression spring 102. Thus, the crimper blade 89 is drawn inwardly through a longitudinal slot in the forming cylinder 70 to engage the projecting end of the formed tube.

As the crimper blade 89 engages the end of the tube, the tube is continuously being rotated on the mandrel 75 and the cam 100 causes the lever 97 to pull the rod 92 inwardly in an increasing amount until the crimp is formed by the notch 90 in the blade 89. The spindle head 87 is provided with a concave edge to cooperate in forming the crimp.

Once the roller 98 of the lever 97 has passed the high point of the lobe of the cam 100, the rods 91 and 92 will be returned to their extended position in which the crimper blade 89 is clear of the cylinder 70 and the spindle head 87.

The spindle 88 extends through the shaft 62 and is slidably received through the legs of a U-shaped yoke 103. One end of a short link 104 is pinned to the yoke 103 adjacent its rear end and the other end of the short link 104 is pinned to an end of a long link 105, the other end of which is pivoted on an upright support 166. The end of the spindle 88 that is received in the yoke 103 is threaded and mounts a nut 106 that defines a stop and an additional nut 107 that holds a compression spring 108 biased between the nut 107 and a short leg 109 of the yoke 103. The short leg 109 is adapted to clear a projection 110 of a stop 111 but a longer leg 112 of the yoke 103 lies to the outside of the projection 110 and is adapted to engage the same.

A rod 113 is pivotally connected between an intermediate point of the long link 105 and a free end of a cam follower lever 114. The cam follower lever 114 is piovtally mounted at its lower end on a bracket 121 secured to the top plate 21 and a roller 115 is rotatably secured to the lever 114 intermediate its ends. The roller 115 rides the periphery of a cam 116 keyed to the cam shaft 66, and a tension spring 117 urges the roller 115 against the cam 116.

Figure 7:
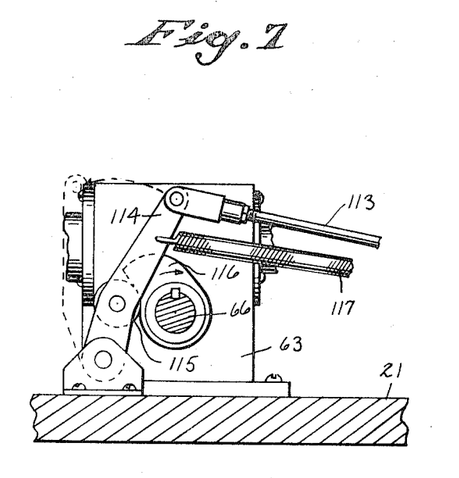
FIG. 7 is a view in vertical section taken in the plane of the line 7—7 of FIG. 1.
Figure 8:
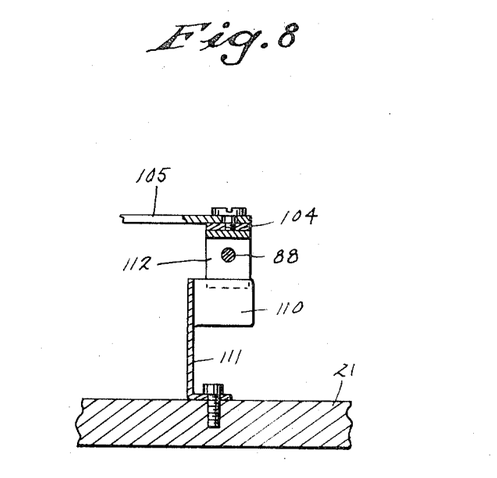
FIG. 8 is a view in vertical section taken in the plane of the line 8—8 of FIG. 2.
Figures 9, 16:
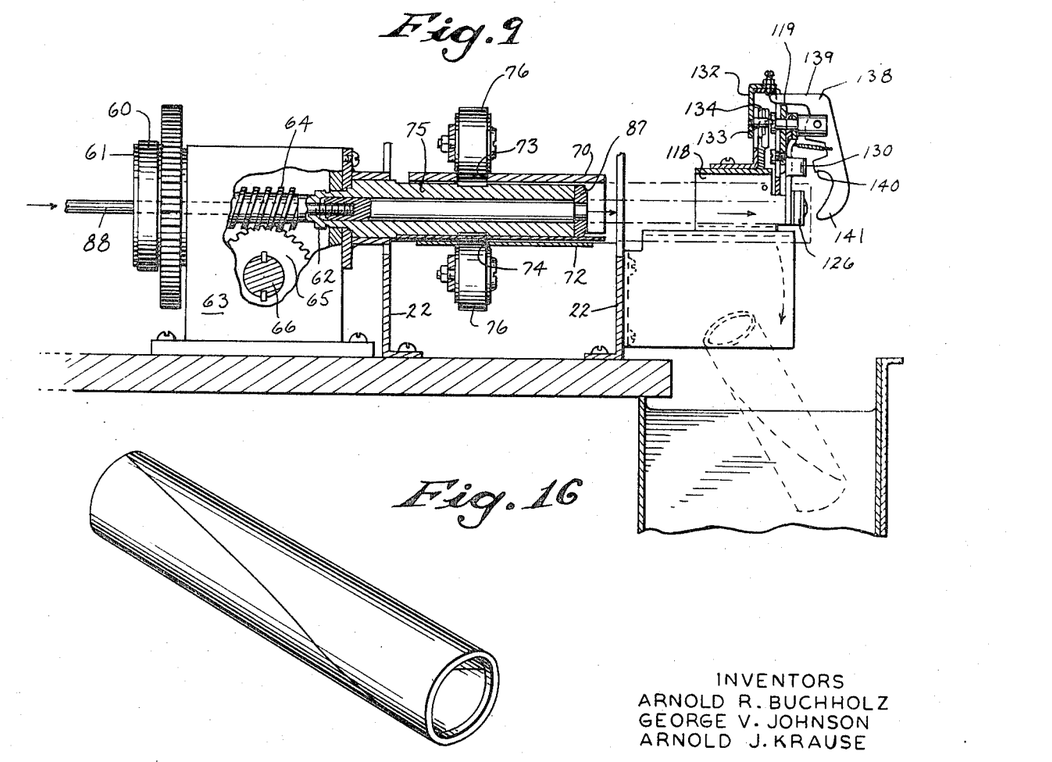
FIG. 9 is a view in vertical section and partly in elevation taken in the plane of the line 9—9 of FIG. 1.
FIG. 16 is a view in perspective of a pre-crimped coin wrapper formed by the machine in accordance with the present invention.

In the normal retracted position of the spindle 88, the spindle head 87 forms a continuation of the mandrel 75 and the longer leg 112 of the yoke 103 is against the projection 110. This normal position is achieved by the rod 113 forcing link 105 to the full line position of FIG. 1 under the action of the spring 117 when the roller 115 is at a low point on the cam 116. As the cam 116 is rotated, this position is undisturbed for a major portion of one revolution of the cam 116. However, when the roller 115 engages the start of the lobe of the cam 116 the lever 114 is rotated clockwise as viewed in FIG. 7 thereby pulling the rod 113 and shifting the link 105 to the dotted line position of FIG. 1. This, of course, causes the spindle 88 to be moved through the through shaft 62 and outwardly beyond the end of the mandrel 75. The formed coin wrapper with one end crimped is engaged by the spindle head 87 and the formed coin wrapper is forcibly withdrawn from about the mandrel 75, which is slightly tapered to facilitate removal. The outward motion of the spindle 88 and spindle head 87 continues until the roller 115 reaches the high point on the lobe of the cam 116 and this corresponds to a distance sufficient to position the formed coin wrapper within a removing mechansim to be described. After the roller 115 passes the high point of the cam 116 the spindle 88 is retracted for a subsequent coin wrapper forming operation.

The compression spring 108 is so positioned on the spindle 88 that the spindle head 87 is normally held slightly away from the end of the mandrel 75. Thus, when the crimped blade 89 is forced against the spindle head 87, the spindle is depressed and the spring 108 compressed so that removal of the crimper blade 89 releases the spring 108 and gives a push to free the formed wrapper from the mandrel 75.

Figure 14:
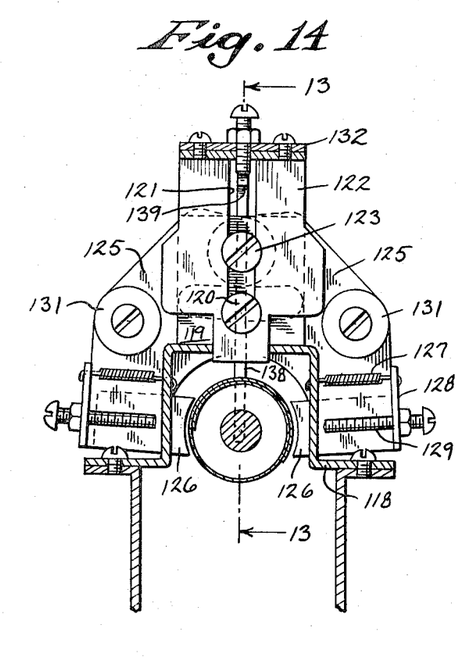
FIG. 14 is a view in vertical section taken in the plane of the line 14—14 of FIG. 13.

The coin wrapper removal mechanism is mounted on a downwardly opening U-shaped housing 118 secured by brackets to the outside of the right stanchion 22. The housing 118 has an opening of sufficient dimension to accommodate a formed coin wrapper (see FIG. 14). The housing 118 includes a forward, upwardly bent mounting plate portion 119 that threadedly receives a guide screw 120. The guide screw 120 is also slidably received in a vertical slot 121 provided in an actuating member 122. A second screw 123 is also disposed in the slot 121 above the guide screw 120 and this second screw 123 is received within the stub shaft end of a pivot yoke 124. The pivot yoke 124 projects through the mounting plate portion 119 of the housing 118 and pivotally supports the overlapping legs of a pair of gripper support members 125.

The lower ends of the gripper support members 125 each mount a transverse gripper 126 formed with a sheet of high friction material, such as polypropylene, sandwiched between a pair of rigid plates. The facing sides of the grippers 126 are formed to mate with the outer cylindrical surface of the formed coin wrapper. A spring 127 is connected between each side of the housing 118 and a bent bracket portion 128 formed on a respective gripper support member 125 to urge the lower end of the gripper inwardly towards engagement with a coin wrapper disposed within the housing 118. An adjustable stop in the form of a screw 129 is provided on each gripper support member 125 to limit the amount of inward travel under the urging of the springs 127.

The gripper support members 125 further include a pair of longitudinally projecting fingers 130 that are parallel and tend to abut under the urging of the springs 127. Rollers 131 are also provided on each member 125 and the rollers 131 are adapted to be engaged by the sides of the actuating member 122 as the actuating member 122 is forced downwardly between the rollers 131. The rollers 131 are spaced apart a preselected distance so that engagement by the actuating member 122 will cause the ends of the gripper support members 125 to be moved outwardly and have the grippers 126 release a formed coin wrapper disposed within the housing 118.

Downward movement of the actuating member 122 is effected in response to the downward movement of the blade holder 44 of the cutting mechanism, as follows: A plate 132 is secured to the top of the actuating member 122 and depends downwardly therefrom to support a pin 133 received in a notch provided in one end of a lever 134. The lever 134 is pivoted intermediate its ends and has its other end connected by a rod 135 to another lever 136 pivotally mounted between its ends on the adjacent stanchion 22. The opposite end of the lever 136 bears against the underside of a yoke portion 46 of the blade holder 44. The end of the lever 134 adjacent the rod 135 is urged downwardly by a spring 137 so that the normal position of the actuating member 122 is its uppermost position.

Figure 15:
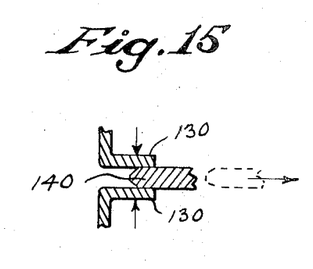
FIG. 15 is a view in generally horizontal section taken in the plane of the line 15—15 of FIG. 13.

When the actuating member 122 is in its normal upper position, the rollers 131 are free and the gripper support members 125 under the urging of the springs 127 would tend to be moved inwardly except for the presence of a trip level 138. The trip lever 138 is pivoted intermediate its ends in the pivot yoke 124 and has an upward projecting arm 139 disposed in the slot 121 of the actuating member 122 and adapted to be engaged by an adjusting screw on the member 122 when the same is moved downwardly. Disposed below the pivotal support of the trip lever 138 is a wedge portion 140 adapted to be sandwiched between the fingers 130 of the gripper support members 125 (see FIG. 15). At the very bottom of the trip lever 138 is a knee 141 in the path of travel of the spindle head 87. A tension spring 142 connects the trip lever 138 below its pivot point to the mounting plate portion 119 and thereby urges the wedge portion 140 between the fingers 130 of the gripper support members 125 when the actuating member 122 is in its normal upper position.

When the wedge portion 140 is so disposed the gripper support members 125 are not permitted to come together a sufficient distance to have the grippers 126 engage a coin wrapper. However, when the spindle 88 is moved outwardly from the mandrel 75, as previously described, the spindle head 87 will engage the knee 141 of the trip lever 138 to rotate the same about its pivot and cause the wedge portion 140 to be removed from between the fingers 130. This permits the gripper support members 125 to be moved together until the fingers 130 thereof abut and in such position the grippers 126 engage the sides of the formed coin wrapper held upon the spindle head 87. The coin wrapper is so held and the spindle 88 is permitted to withdraw back into the mandrel 75.

In the sequence of events the cutting of another segment of web material will cause the actuating member 122 to be forced downwardly thereby having its sides engage the rollers 131 to spread the grippers 126 outwardly away from engagement with the coin wrapper. At the same time, the engagement of the arm 139 of the trip lever 138 by the adjusting screw further pivots the trip lever 138 to remove the knee from the coin wrapper and the coin wrapper being then unsupported is permitted to fall into any suitable receptacle. The elements then return to their normal position after the cutting action has occurred to await the acceptance of a subsequent formed coin wrapper.

In review, the operation of the pre-crimped coin wrapper forming machine is as follows:

With the motor 58 energized, the through shaft 62 including the mandrel 75 and the cam shaft 66 are continuously rotated. Thus, the driven shaft 30 is continuously driven to draw the web 26 from the roll 25 and force it through the cutting stage and into the forming cylinder 70. Initially, the cams 56, 116, 100 and 85 are so positioned that the gripping rollers 76 engage the periphery of the mandrel 75, the spindle 88 and the spindle head 87 are retracted, the crimping blade 89 is out of the way of the cylinder 70, and the blade holder 44 is in its up position.

As the cam shaft 66 is rotated, the projection 57 of the cam 56 will first encounter the roller 55 to pivot the lever 52 and depress the blade holder 44 thereby forming a blank. The leading edge of this blank has by this time entered the cylinder 70 and the gripping rollers 76 cooperate with the mandrel 75 to wind the blank about the mandrel 75 into a tube having several layers forming its walls.

While the tube is being formed, the cam 100 will rotate to a position in which the lever 97 is pivoted to draw the crimper blade 89 into engagement with the end of the tube to form the crimp. Near the end of the crimping stage the cam 85 will pivot the lever 82, thereby forcing the gripping rollers 76 out of engagement with the tube in preparation for removal of the formed wrapper from the mandrel 75.

When this has been accomplished the cam 116 pivots the lever 115 thereby pulling the rod 113 and extending the spindle 88 with the formed wrapper thereon. The spindle head ultimately engages the trip lever 138 and moves the same so that the grippers 126 engage and hold the wrapper. The spindle 88 will then retract as the cam 116 continues to rotate.

Since the web 26 is continuously being fed through the cutting stage, a new blank is ready to be formed. When the projection 57 of the cam 56 again encounters the roller 55 of the lever 52, the blade holder 44 will be forced downwardly to sever the web and this action will also act through the levers 136 and 134 to cause the actuating member 122 to spread the grippers 126 and release the wrapper.

Figures 17, 18:
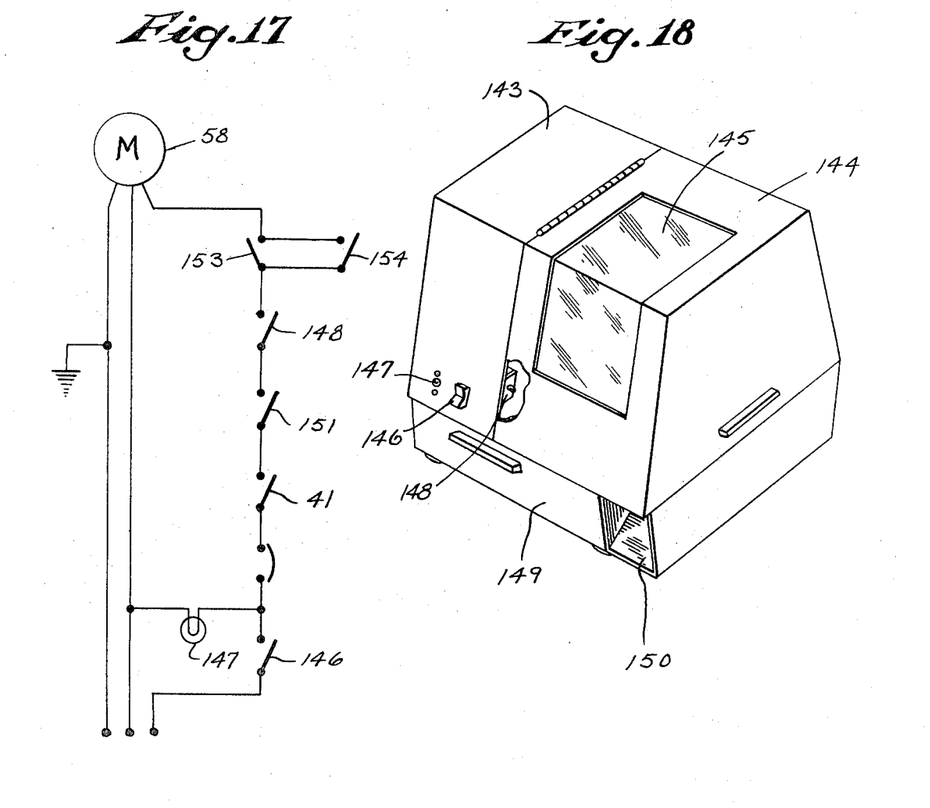
FIG. 17 is a diagrammatic view of the motor control circuit for the machine.
FIG. 18 is a view in perspective of the machine with covers in place.

The machine may be housed in a suitable enclosure such as shown in FIG. 18, in which a split cover is disposed over the top plate 21 with the left half 143 secured thereto and the right half 144 hinged to the left half. The right half 144 may include a window 145 to view the operating mechanism, and, specifically, the procession of the web material through the machine. An on-off switch 146 and a warning light 147 are mounted on the left cover half, and a plunger actuated cover switch 148 is mounted at the edge of the left half 143 to be engaged by the right cover half 144 when the right cover half is closed. A drawer 149 may be suspended from the top plate 21 to collect the scraps from the cutting operation, and a discharge ramp 150 leads downwardly from beneath the housing 118 to the exterior of the enclosure.

The electrical circuit for energizing the motor 58 requires the concurrence of a number of operating conditions, each of which is sensed by a switch. First, if the machine is provided with a cover, the cover must be closed; secondly, a sufficient amount of web material must be available on the roll 25; thirdly, the web must be moving freely through the cutting stage; and fourthly, the crimper blade 89 must be clear of the cylinder 70 before the spindle 88 and spindle head 87 is to be extended. The closing of the cover is sensed by the cover switch 148 which is normally open but is closed when the left cover half 144 is closed. The amount of web material on the roll 25 is sensed by a web roll switch 151 mounted on the left stanchion 22 and having a spring biased switch arm 152 with a roller that projects through an opening in the left stanchion and rides upon the side of the roll 25 near the core thereof. The web roll switch 151 is normally open, but when web material is present at the roller the switch is held closed. When the roll has been depleted, the switch arm 152 can move towards the stanchion and thereby open the web roll switch 151.

The stripper plate switch 41 is normally open but is held closed so long as the stripper plate 40 is in its normal position. If web material does not pass smoothly through the cutting mechanism, the web will jam and elevate the stripper plate 40 thereby opening the switch 41. A normally open spindle switch 153 is mounted on the stop 111 to be engaged by the short leg 109 and the yoke 103. When the spindle 88 is fully retracted, the spindle switch 153 is closed, and it returns to its normally open condition as soon as the spindle 88 advances. A cam shaft switch 154 is normally open but is closed by engagement of its switch arm 155 with a lobe on the periphery of the cam 85. The lobe is so positioned on the cam 85 that it will close the cam shaft switch 154 at a point in the rotation of the cam shaft 66 immediately following the point at which the lever 82 is rotated by the cam 85 to remove the gripping rollers 76 from engagement with the formed tube on the mandrel 75 and also immediately after the cam roller 98 begins to descend from the high point of the cam 100 and thus begins to move the crimper blade 89 from the cylinder 70.

Figure 19:
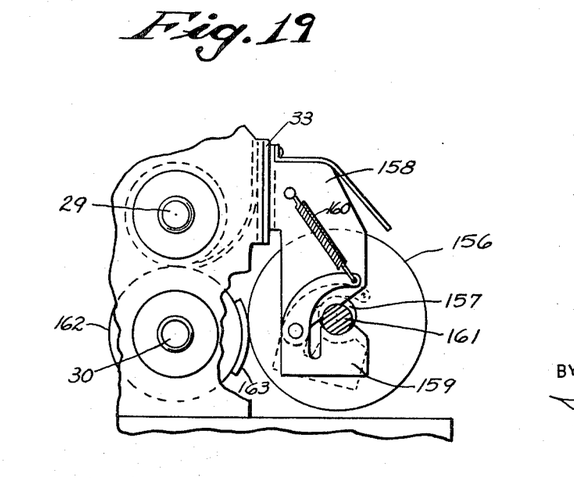
FIG. 19 is a side view in elevation of a mechanism for applying a printed legend to the coin wrappers.

It is common practice to provide a printed legend on coin wrappers which set forth both the denomination and total value of the coins in the wrapper. In the coin wrapper forming machine of this invention, such a legend may be printed on the wrapper stock before it is inserted into the machine. Alternately, means may be provided to print the legend on the web as it passes through the machine. Referring to FIG. 19, an ink roller 156 is rotatably mounted on a shaft 157 which is held in place against a bracket 158 secured to the end plate 33. A lock plate 159 is pivotally mounted on each end of the bracket 158 and is biased by a spring 160 to urge the lock plate 159 to retain a stub shaft portion 161 of the shaft 157 against the bracket 158. A print roll 162, having rubber type 163 bearing the legend attached to a portion of its periphery, is secured to the driven shaft 30 between the feed rollers 31. Ink is picked up by the type 163 from the ink roller 156 and is transferred to the web as the same is moved between the feed rollers 31 and idler roller 28.

The ink roller 156 is preferably formed of plastic having interconnected microscopic pores filled with ink which is fed to the surface by capillary action. Such a material is marketed by S. C. Johnson & Son, Inc. under the trademark "Porelon." The stub shaft portion 161 is made eccentric of the shaft 157 so that by rotation of the stub shaft portion 161 within its mounting on the bracket 158, the ink roller 156 can be brought closer to the print roll 162 to compensate for wear of the ink roller.

What is claimed is:

1. In a pre-crimped coin wrapper forming apparatus in which a wrapper blank is formed into a tube about a rotatable mandrel, the formed tube is crimped at one end by crimping means, the formed and crimped wrapper is thereafter extracted from an mandrel by the outward movement of a spindle extending through the mandrel and slidable therein, and such spindle includes a spindle head which normally forms an extension of the mandrel, a removal mechanism aligned with said spindle and spaced from said mandrel, said removal mechanism comprising:

a support;

a pair of opposing grippers pivotally mounted on said support and normally urged toward each other;

a trip lever pivotally supported on said support and having a knee portion disposed in the path of travel of said spindle head and normally urged to a position in which the trip lever holds said grippers apart a distance greater than the diameter of the formed wrapper, said trip lever being pivoted by engagement with said spindle head to release said grippers and to allow the same to engage the formed wrapper and to hold the same as said spindle is retracted to remove the formed wrapper from said spindle;

and means for rotating said grippers apart to drop the formed wrapper;

said trip lever being reintroduced between said grippers to hold the same apart for acceptance of a subsequent formed wrapper.

2. In a pre-crimped coin wrapper forming apparatus in which a web of material is fed over a track, actuable knife means severs the web to form a wrapper blank, the wrapper blank is formed into a tube about a rotatable mandrel, the formed tube is crimped at one end by crimping means, the formed and crimped wrapper is thereafter extracted from the mandrel by the outward movement of a spindle extending through the mandrel and slidable therein, and such spindle includes a spindle head which normally forms an extension of the mandrel, actuable removal means aligned with said spindle and spaced from said mandrel, said removal means being actuated by said spindle head when said spindle is moved outwardly to engage the formed wrapper and hold the same when said spindle is retracted;

and means for deactuating said removal means to have said removal means release the formed wrapper, said deactuating means being responsive to the actuation of said knife means to deactuate said removal means when said knife means is actuated to form the subsequent wrapper blank.

3. In a pre-crimped coin wrapper forming apparatus in which a wrapper blank is formed into a tube about a rotatable mandrel operating in a hollow forming cylinder having an open discharge end, a crimping mechanism for forming a crimp on one end of the formed tube, said crimping mechanism comprising:

a support disposed adjacent to said cylinder;

a first rod journaled in said support for sliding movement in a direction parallel to the axis of said mandrel and having a normal outer position;

biasing means urging said first rod to its normal position;

a crimping blade having a crimping notch adjacent one end and being pivotally connected to said first rod at its other end;

a second rod journaled for sliding movement in said support in a direction parallel to the axis of said mandrel;

a link pivotally connecting one end of said second rod to said blade at a point intermediate the ends of said blade;

and crimper actuating means connected to said second rod for moving the same axially;

whereby initial movement of said second rod by said actuating means pivots said blade from an idle position free of said open end of said cylinder and through an arc into a working position in which said blade is perpendicular to the axis of said mandrel and further movement of said second rod by said actuating means moves said blade against the urging of said biasing means in a path parallel to said mandrel axis to crimp one end of the formed tube.

4. In pre-crimped coin wrapper forming apparatus having a base, an electric motor connected by a circuit to a source of current, means mounted on said base for receiving a roll of web material, a web track on said base, means driven by said electric motor for continuously withdrawing the web from said roll and moving the same along said track, knife means disposed intermediate of said track and adapted when actuated to sever the web to form a wrapper blank, and means powered by said motor for forming said blank into a tube and crimping one end of said tube, a plate cantilevered above said web track in advance of said knife means, said plate being normally disposed a distance above said track such that a single thickness of the web will pass between said plate and said track, said plate being lifted by the web when the same bunches up upon jamming in said knife means, and a switch actuated by the lifting of said plate to interrupt said circuit to halt the operation of said apparatus.

References Cited

UNITED STATES PATENTS

| | | | |
|---|---|---|---|
| 1,351,115 | 8/1920 | Morse | 83—683 |
| 1,586,977 | 6/1926 | Donnellan | 93—81 |
| 1,684,617 | 9/1928 | Biggert | 83—633 |
| 3,105,421 | 10/1963 | Petri | 93—81.1 |

BERNARD STICKNEY, Primary Examiner

U.S. Cl. X.R.

93—81; 83—633, 588, 683